(12) United States Patent
Crowther et al.

(10) Patent No.: US 11,028,192 B2
(45) Date of Patent: Jun. 8, 2021

(54) SOLUTION PROCESS TO MAKE ETHYLENE COPOLYMERS

(71) Applicant: EXXONMOBIL CHEMICAL PATENTS INC., Baytown, TX (US)

(72) Inventors: Donna J. Crowther, Blairsville, GA (US); Hua Zhou, Missouri City, TX (US); Jacqueline A. Lovell, Crosby, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 92 days.

(21) Appl. No.: 16/492,736

(22) PCT Filed: Feb. 12, 2018

(86) PCT No.: PCT/US2018/017752
§ 371 (c)(1),
(2) Date: Sep. 10, 2019

(87) PCT Pub. No.: WO2018/182860
PCT Pub. Date: Oct. 4, 2018

(65) Prior Publication Data
US 2020/0216582 A1     Jul. 9, 2020

Related U.S. Application Data

(60) Provisional application No. 62/477,094, filed on Mar. 27, 2017.

(30) Foreign Application Priority Data

Jun. 1, 2017   (EP) .................................. 17173988

(51) Int. Cl.
*C08F 210/16*   (2006.01)
*C08F 232/04*   (2006.01)
(Continued)

(52) U.S. Cl.
CPC ........ *C08F 4/65927* (2013.01); *C08F 210/06* (2013.01); *C08F 210/14* (2013.01);
(Continued)

(58) Field of Classification Search
CPC .............. C08F 4/65908; C08F 4/65927; C08F 210/16; C08F 32/00; C08F 32/04; C08F 232/00; C08F 232/04; C08F 232/08
See application file for complete search history.

(56) References Cited

U.S. PATENT DOCUMENTS

| | | | |
|---|---|---|---|
| 5,756,607 | A | 5/1998 | Lux et al. |
| 6,383,969 | B1 | 5/2002 | Francois et al. |

(Continued)

FOREIGN PATENT DOCUMENTS

| | | |
|---|---|---|
| EP | 1052263 | 11/2000 |
| EP | 1727841 | 9/2005 |

(Continued)

OTHER PUBLICATIONS

Irwin, Levi J. et al. (2004) "A Sterically Expanded Constrained Geometry Catalyst for Highly Active Olefin Polymerization and Copolymerization: An Unyielding Comonomer Effect," J. Am. Chem. Soc., v.126, pp. 16716-16717.

*Primary Examiner* — Rip A Lee

(57) ABSTRACT

This invention relates to a process to polymerize olefins comprising contacting, in solution phase at a temperature of 60° C. to 200° C., ethylene, and at least one olefin comonomer with a catalyst system comprising a non-coordinating anion activator and a metallocene catalyst compound, preferably represented by the formula:

(Continued)

Relative activities from ethylene octene copolymerizations at 110°C

US 11,028,192 B2
Page 2

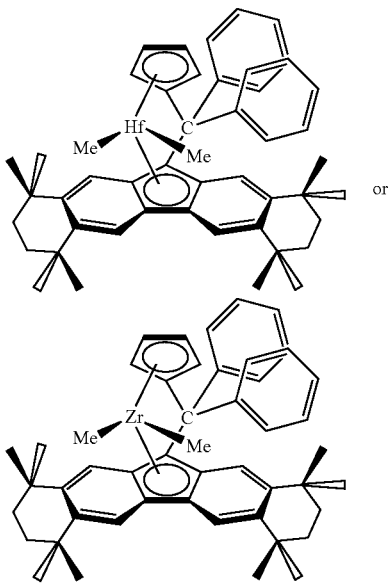

and
2) obtaining ethylene polymer having an Mw greater than 100,000 g/mol, preferably greater tha 400,000 g/mol.

20 Claims, 5 Drawing Sheets

(51) Int. Cl.
  C08F 4/64        (2006.01)
  C08F 4/76        (2006.01)
  C08F 4/6592      (2006.01)
  C08F 232/08      (2006.01)
  C08F 210/14      (2006.01)
  C08F 210/06      (2006.01)
  C08F 4/659       (2006.01)
  C08F 236/00      (2006.01)

(52) U.S. Cl.
  CPC ........ C08F 210/16 (2013.01); C08F 232/08 (2013.01); *C08F 4/65908* (2013.01); *C08F 232/04* (2013.01); *C08F 236/00* (2013.01)

(56) References Cited

U.S. PATENT DOCUMENTS

| | | | | |
|---|---|---|---|---|
| 6,469,188 B1 * | 10/2002 | Miller | ................. | B01J 31/2295 502/103 |
| 6,559,089 B1 | 5/2003 | Razavi et al. | | |
| 6,693,153 B2 * | 2/2004 | Miller | ................. | B01J 31/2295 502/103 |
| 6,897,273 B2 | 5/2005 | Szul et al. | | |
| 6,914,027 B2 | 7/2005 | Patrick et al. | | |
| 6,939,928 B1 * | 9/2005 | Kawai | ..................... | C08F 10/00 526/160 |
| 7,241,848 B2 * | 7/2007 | Tohi | ........................ | C07F 17/00 526/133 |
| 7,393,907 B2 | 7/2008 | Imuta et al. | | |
| 7,393,965 B2 * | 7/2008 | Tohi | ........................ | C07F 17/00 556/11 |
| 7,452,946 B2 * | 11/2008 | Matsuura | ................ | C08F 10/00 525/240 |
| 7,700,708 B2 * | 4/2010 | Takahashi | ............. | C08F 297/08 526/348.2 |
| 7,741,419 B2 * | 6/2010 | Tohi | ........................ | C08F 10/00 526/160 |
| 7,879,960 B2 | 2/2011 | Funaya et al. | | |
| 8,129,473 B2 | 3/2012 | Maier et al. | | |
| 8,129,489 B2 * | 3/2012 | Okamoto | ............. | C08F 210/16 526/348 |
| 9,026,906 B2 * | 5/2015 | Mathai | .................... | G06F 9/451 715/273 |
| 9,150,676 B2 | 10/2015 | Kol et al. | | |
| 9,340,628 B2 * | 5/2016 | Tohi | ........................ | C08F 4/52 |
| 9,458,261 B2 * | 10/2016 | Funaya | ................ | C08F 4/65927 |
| 9,969,827 B2 * | 5/2018 | Endo | ..................... | C08F 210/16 |
| 10,040,884 B2 * | 8/2018 | Harada | ................ | C10M 177/00 |
| 10,131,726 B2 * | 11/2018 | Ichino | ........................ | C08J 3/24 |
| 2002/0086958 A1 | 7/2002 | Crowther et al. | | |
| 2002/0103313 A1 | 8/2002 | Peterson et al. | | |
| 2003/0162651 A1 | 8/2003 | Collins et al. | | |
| 2004/0192866 A1 | 9/2004 | Reichert et al. | | |
| 2005/0131171 A1 | 6/2005 | Tohi et al. | | |
| 2005/0288178 A1 | 12/2005 | Jensen et al. | | |
| 2006/0251835 A1 | 11/2006 | Maziers et al. | | |
| 2006/0270812 A1 | 11/2006 | Tohi et al. | | |
| 2007/0117941 A1 | 5/2007 | Brant | | |
| 2007/0255021 A1 | 11/2007 | Marin et al. | | |
| 2009/0270580 A1 * | 10/2009 | Satoh | .................... | C08F 210/16 526/348.6 |
| 2010/0190941 A1 * | 7/2010 | Funaya | .................... | C07F 17/00 526/126 |
| 2015/0018491 A1 * | 1/2015 | Satoh | ........................ | C08J 5/18 525/240 |
| 2016/0347894 A1 * | 12/2016 | Endo | ..................... | C08F 210/18 |
| 2016/0355622 A1 * | 12/2016 | Ichino | .................... | C08F 210/18 |

FOREIGN PATENT DOCUMENTS

| | | |
|---|---|---|
| EP | 2711380 | 11/2012 |
| EP | 3106481 | 8/2015 |
| JP | 2004/051676 | 2/2004 |
| WO | 1999/061488 | 12/1999 |

* cited by examiner

SOLUTION PROCESS TO MAKE ETHYLENE COPOLYMERS

PRIORITY CLAIM

This application is the national stage application for PCT Application PCT/US2018/017752, filed Feb. 12, 2018 which claims priority to and the benefit of U.S. Ser. No. 62/477,094, filed Mar. 27, 2017, which are incorporated by reference in their entirety.

FIELD OF THE INVENTION

This invention relates to process to make ethylene copolymers using cyclopentadienyl-fluorenyl transition metal compounds.

BACKGROUND OF THE INVENTION

Olefin polymers are of great use in industry. Hence there is interest in finding new processes that increase the commercial usefulness of catalysts to make olefin polymers and enhance the production of polymers having improved properties.

U.S. Pat. No. 6,693,153, at column 47, discloses the production of syndiotactic polypropylene at zero and 20° C. using methylalumoxane and the compound of the formula:

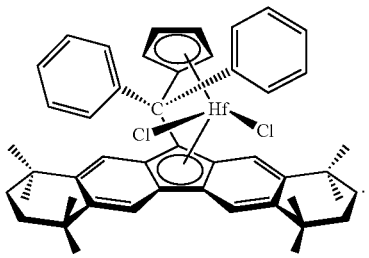

Other references of interest include: EP 1 052 263 A2; US 2005/131171; US 2003/162651; US 2002/086958; US 2005/148460; US 2004/192866; US 2007/255021; US 2005/288178; U.S. Pat. No. 5,756,607; EP 1 086 146 A1; U.S. Pat. No. 8,129,473; US 2002/103313; U.S. Pat. Nos. 6,914,027; 6,559,089; 6,897,273; EP 1 727 841 B1; U.S. Pat. Nos. 7,393,907; 6,383,969; US 2003/162651 A1; J. Am. Chem. Soc. 2004, 126, 16716-16717; US 2006/251835 and U.S. Pat. No. 9,150,676.

There is still a need in the art for new and improved processes for the polymerization of olefins, particularly ethylene, in order to achieve specific polymer properties, such as high molecular weights in combination with excellent comonomer incorporation.

SUMMARY OF THE INVENTION

This invention relates to a method to polymerize olefins comprising contacting, in solution phase at a temperature of 60° C. to 200° C., ethylene and at least one olefin comonomer with a catalyst system comprising a non-coordinating anion activator and a metallocene catalyst compound represented by the formula:

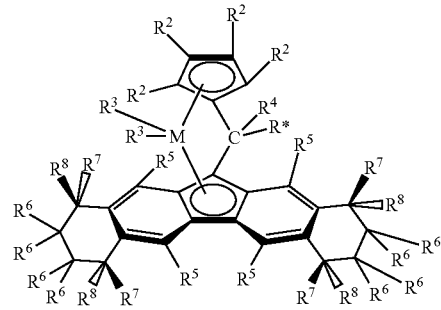

wherein M is Hf or Zr;
each $R^3$ is independently an anionic group;
each $R^2$ is independently H or a $C_1$ to $C_{20}$ hydrocarbyl or $C_1$ to $C_{20}$ substituted hydrocarbyl;
$R^4$ is a hydrocarbyl radical having from 1 to 20 carbon atoms, hydrides, amides, alkoxides, sulfides, phosphides, halides, dienes, amines, phosphines, ethers, and a combination thereof;
R* is phenyl or a substituted phenyl;
each $R^5$, $R^6$, $R^7$, and $R^8$ is independently H or a $C_1$ to $C_{20}$ hydrocarbyl or $C_1$ to $C_{20}$ substituted hydrocarbyl;
where at least one of each adjacent pair of $R^7$ and $R^8$ is not H; and
2) obtaining ethylene polymer having an Mw greater than 100,000 g/mol, and optionally
a) the % comonomer incorporated is X % or more, where X=(Z−858,441)/(−26,760), where Z is the Mn in g/mol of the polymer; and/or
b) the polymer comprises ethylene, diene, and optional $C_3$ to $C_{20}$ olefin comonomer.

This invention relates to a method to polymerize olefins comprising contacting, in solution phase at a temperature of 60° C. to 200° C., ethylene, at least one diene comonomer, and optionally a $C_3$ to $C_{20}$ alpha olefin with a catalyst system comprising a non-coordinating anion activator and a metallocene catalyst compound represented by the formula:

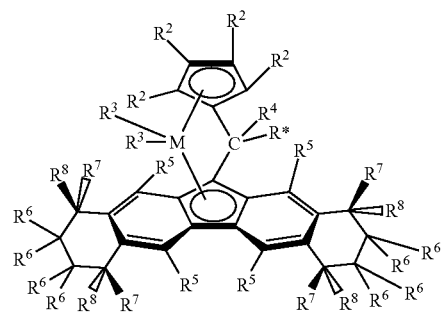

wherein M is Hf or Zr;
each $R^3$ is independently an anionic group;
each $R^2$ is independently H or a $C_1$ to $C_{20}$ hydrocarbyl or $C_1$ to $C_{20}$ substituted hydrocarbyl;
$R^4$ is a hydrocarbyl radical having from 1 to 20 carbon atoms, hydrides, amides, alkoxides, sulfides, phosphides, halides, dienes, amines, phosphines, ethers, and a combination thereof;
R* is phenyl or a substituted phenyl;
each $R^5$, $R^6$, $R^7$, and $R^8$ is independently H or a $C_1$ to $C_{20}$ hydrocarbyl or $C_1$ to $C_{20}$ substituted hydrocarbyl;

where at least one of each adjacent pair of $R^7$ and $R^8$ is not H; and 2) obtaining ethylene polymer having an Mw of 400,000 g/mol or more.

DETAILED DESCRIPTION OF THE INVENTION

Figure 1:
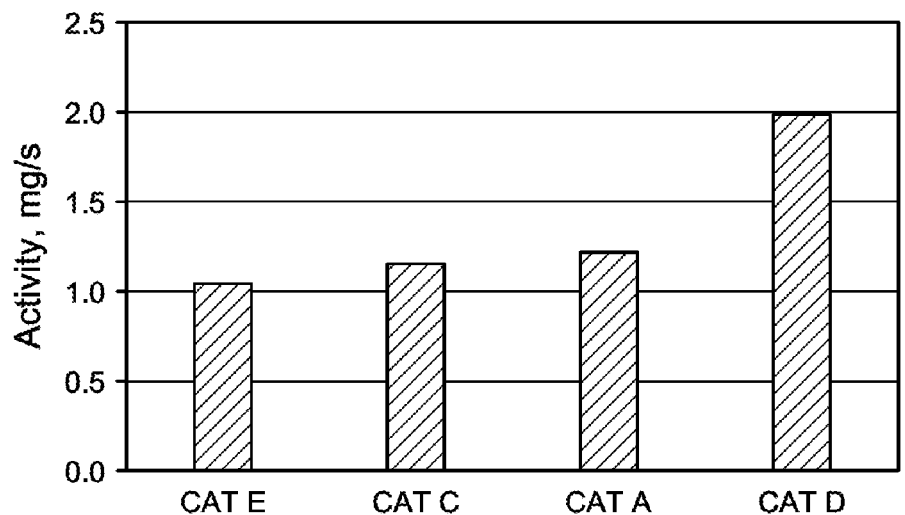
FIG. 1 is a graph showing relative activities from ethylene octene copolymerizations at 110° C.

For the purposes of this invention and the claims thereto, the new numbering scheme for the Periodic Table Groups is used as described in CHEMICAL AND ENGINEERING NEWS, 63(5), pg. 27 (1985). Therefore, a "group 4 metal" is an element from group 4 of the Periodic Table, e.g. Hf, Ti, or Zr.

Unless otherwise indicated, "catalyst productivity" unless otherwise indicated, is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$ hr$^{-1}$. Conversion is the amount of monomer that is converted to polymer product, and is reported as mol % and is calculated based on the polymer yield and the amount of monomer fed into the reactor.

Unless otherwise indicated, catalyst activity is a measure of how active the catalyst is and is reported as the mass of product polymer (P) produced per mole of catalyst (cat) used (kgP/molcat).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For the purposes of this invention, ethylene shall be considered an α-olefin.

For purposes of this invention and claims thereto, unless otherwise indicated, the term "substituted" means that a hydrogen group has been replaced with a heteroatom, or a heteroatom containing group. For example, a "substituted hydrocarbyl" is a radical made of carbon and hydrogen where at least one hydrogen is replaced by a heteroatom or heteroatom containing group. However, in relation to catalyst compounds, the term "substituted" means that a hydrogen group has been replaced with a hydrocarbyl group, a heteroatom, or a heteroatom containing group. For example, methyl cyclopentadiene (Cp) is a Cp group substituted with a methyl group.

As used herein, Mn is number average molecular weight, Mw is weight average molecular weight, and Mz is z average molecular weight, wt % is weight percent, and mol % is mole percent. Molecular weight distribution (MWD), also referred to as polydispersity, is defined to be Mw divided by Mn. Unless otherwise noted, all molecular weight units (e.g., Mw, Mn, Mz) are g/mol. The following abbreviations may be used herein: Me is methyl, Et is ethyl, Pr is propyl, cPR is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn or Bz is benzyl, TMS is trimethylsilyl, TIBAL is tri-isobutylaluminum, TNOAL is tri(n-octyl)aluminum, THF (also referred to as the is tetrahydrofuran, RT is room temperature (and is 23° C. unless otherwise indicated), tol is toluene, EtOAc is ethyl acetate, and Cy is cyclohexyl, MAO is methylalumoxane.

A "catalyst system" is combination of at least one catalyst compound, at least one activator, an optional co-activator, and an optional support material. For the purposes of this invention and the claims thereto, when catalyst systems are described as comprising neutral stable forms of the components, it is well understood by one of ordinary skill in the art, that the ionic form of the component is the form that reacts with the monomers to produce polymers.

In the description herein, the catalyst may be described as a catalyst precursor, a precatalyst compound, catalyst compound or a transition metal compound, and these terms are used interchangeably. A polymerization catalyst system is a catalyst system that can polymerize monomers to polymer. An "anionic ligand" is a negatively charged ligand which donates one or more pairs of electrons to a metal ion.

For purposes of this invention and claims thereto, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may comprise at least one aromatic group.

The terms "hydrocarbyl radical," "hydrocarbyl," "hydrocarbyl group," "alkyl radical," and "alkyl" are used interchangeably throughout this document. Likewise, the terms "group," "radical," and "substituent" are also used interchangeably in this document. For purposes of this disclosure, unless otherwise indicated, "hydrocarbyl radical" is defined to be a $C_1$-$C_{100}$ radical, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with a heteroatom or heteroatom containing group, preferably the hydrocarbyl has been substituted with at least one halogen (such as Br, Cl, F or I) or at least one functional group such as $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$, where $R*$ is a $C_1$ to $C_{20}$ hydrocarbyl and the like, or where at least one heteroatom has been inserted within a hydrocarbyl ring.

The term "alkenyl" means a straight-chain, branched-chain, or cyclic hydrocarbon radical having one or more double bonds. These alkenyl radicals may be optionally substituted. Examples of suitable alkenyl radicals include, but are not limited to, ethenyl, propenyl, allyl, 1,4-butadienyl cyclopropenyl, cyclobutenyl, cyclopentenyl, cyclohexenyl, cyclooctenyl and the like including their substituted analogues.

The term "aryl" or "aryl group" means a six carbon aromatic ring and the substituted variants thereof, including but not limited to, phenyl, 2-methyl-phenyl, xylyl, 4-bromoxylyl. Likewise, heteroaryl means an aryl group where a ring carbon atom (or two or thee ring carbon atoms) has been replaced with a heteroatom, preferably N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

"Complex" as used herein, is also often referred to as catalyst precursor, precatalyst, catalyst, catalyst compound, transition metal compound, or transition metal complex. These words are used interchangeably. Activator and cocatalyst are also used interchangeably.

A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments a co-activator can be pre-mixed with the transition metal compound to form an alkylated transition metal compound.

In the description herein, the catalyst may be described as a catalyst precursor, a precatalyst compound, catalyst compound or a transition metal compound, and these terms are used interchangeably. A polymerization catalyst system is a catalyst system that can polymerize monomers to polymer.

The term "continuous" means a system that operates without interruption or cessation. For example, a continuous process to produce a polymer would be one where the reactants are continually introduced into one or more reactors and polymer product is continually withdrawn.

Process

This invention relates to a method to polymerize olefins comprising contacting, in solution phase at a temperature of 60° C. to 200° C., ethylene and at least olefin comonomer (preferably $C_3$ to $C_{20}$ olefin, preferably propylene, hexene, octene, norbornene or diene) with a catalyst system comprising a non-coordinating anion activator, preferably a bulky activator as defined below, and a metallocene catalyst compound described herein.

This invention also relates to a method to polymerize olefins comprising contacting, in solution phase at a temperature of 60° C. to 200° C., ethylene and at least one diene comonomer and, optionally, an olefin comonomer (preferably $C_3$ to $C_{20}$ olefin, preferably propylene, hexene, octene, or norbornene) with a catalyst system comprising a non-coordinating anion activator, preferably a bulky activator as defined below and a metallocene catalyst compound represented by the catalyst compounds described herein.

This invention relates to a method to polymerize olefins comprising contacting, in solution phase at a temperature of 60° C. to 200° C., ethylene and at least one olefin comonomer with a catalyst system comprising a non-coordinating anion activator and a metallocene catalyst compound represented by the formula:

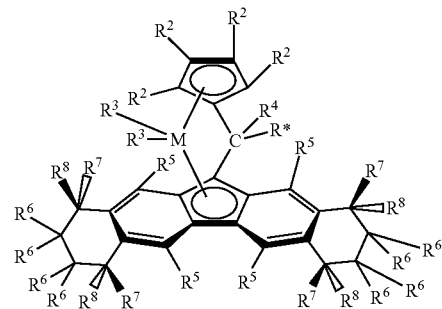

wherein M is Hf or Zr;
each $R^3$ is independently an anionic group;
each $R^2$ is independently H or a $C_1$ to $C_{20}$ hydrocarbyl or $C_1$ to $C_{20}$ substituted hydrocarbyl;
$R^4$ is a hydrocarbyl radical having from 1 to 20 carbon atoms, hydrides, amides, alkoxides, sulfides, phosphides, halides, dienes, amines, phosphines, ethers, and a combination thereof, preferably $R^4$ is H or a $C_1$ to $C_{20}$ hydrocarbyl or $C_1$ to $C_{20}$ substituted hydrocarbyl, preferably $R^4$ is a $C_1$ to $C_{20}$ alkyl, such as butyl, t-butyl, phenyl, or substituted phenyl);
$R^*$ is phenyl or a substituted phenyl (such as an alkoxy substituted phenyl, where the alkyl in the alkoxy is a $C_1$ to $C_{20}$ alkyl);
each $R^5$ is independently H or a $C_1$ to $C_{20}$ hydrocarbyl or $C_1$ to $C_{20}$ substituted hydrocarbyl (preferably methyl, ethyl, propyl, butyl, including t-butyl, pentyl, heptyl, octyl, nonyl, decyl, undecyl, or docecyl);
each $R^6$ is independently H or a $C_1$ to $C_{20}$ hydrocarbyl or $C_1$ to $C_{20}$ substituted hydrocarbyl (preferably methyl, ethyl, propyl, butyl, including t-butyl, pentyl, heptyl, octyl, nonyl, decyl, undecyl, or docecyl);
each $R^7$ is independently H or a $C_1$ to $C_{20}$ hydrocarbyl or $C_1$ to $C_{20}$ substituted hydrocarbyl (preferably methyl, ethyl, propyl, butyl, including t-butyl, pentyl, heptyl, octyl, nonyl, decyl, undecyl, or docecyl);

each $R^8$ is independently H or a $C_1$ to $C_{20}$ hydrocarbyl or $C_1$ to $C_{20}$ substituted hydrocarbyl (preferably methyl, ethyl, propyl, butyl, including t-butyl, pentyl, heptyl, octyl, nonyl, decyl, undecyl, or docecyl);
where at least one of each adjacent pair of $R^7$ and $R^8$ is not H; and 2) obtaining ethylene polymer having an Mw greater than 100,000 g/mol and, optionally:
a) the % comonomer incorporated is X % or more, where X=(Z−858,441)/(−26,760), where Z is the Mn in g/mol of the polymer (alternately X=(Z−875,000)/(−26,760), preferably X=(Z−890,000)/(−26,760)); and/or
b) the polymer comprises ethylene, diene, and optional $C_3$ to $C_{20}$ olefin comonomer.

This invention relates to a method to polymerize olefins comprising contacting, in solution phase at a temperature of 60° C. to 200° C., ethylene, at least one diene comonomer, and optionally a $C_3$ to $C_{20}$ alpha olefin with a catalyst system comprising a non-coordinating anion activator and a metallocene catalyst compound represented by the formula:

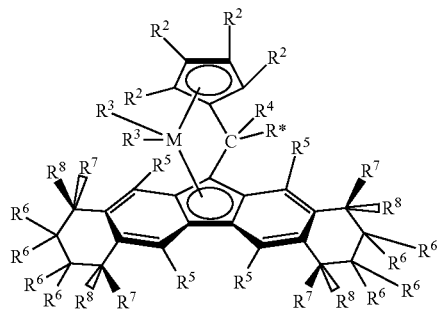

wherein M is Hf or Zr;
each $R^3$ is independently an anionic group;
each $R^2$ is independently H or a $C_1$ to $C_{20}$ hydrocarbyl or $C_1$ to $C_{20}$ substituted hydrocarbyl;
$R^4$ is H or a $C_1$ to $C_{20}$ hydrocarbyl or $C_1$ to $C_{20}$ substituted hydrocarbyl (preferably a $C_1$ to $C_{20}$ alkyl, such as butyl, t-butyl, phenyl, or substituted phenyl);
R* is phenyl or a substituted phenyl (such as an alkoxy substituted phenyl, where the alkyl in the alkoxy is a $C_1$ to $C_{20}$ alkyl);
each $R^5$ is independently H or a $C_1$ to $C_{20}$ hydrocarbyl or $C_1$ to $C_{20}$ substituted hydrocarbyl (preferably methyl, ethyl, propyl, butyl, including t-butyl, pentyl, heptyl, octyl, nonyl, decyl, undecyl, or docecyl);
each $R^6$ is independently H or a $C_1$ to $C_{20}$ hydrocarbyl or $C_1$ to $C_{20}$ substituted hydrocarbyl (preferably methyl, ethyl, propyl, butyl, including t-butyl, pentyl, heptyl, octyl, nonyl, decyl, undecyl, or docecyl);
each $R^7$ is independently H or a $C_1$ to $C_{20}$ hydrocarbyl or $C_1$ to $C_{20}$ substituted hydrocarbyl (preferably methyl, ethyl, propyl, butyl, including t-butyl, pentyl, heptyl, octyl, nonyl, decyl, undecyl, or docecyl);
each $R^8$ is independently H or a $C_1$ to $C_{20}$ hydrocarbyl or $C_1$ to $C_{20}$ substituted hydrocarbyl (preferably methyl, ethyl, propyl, butyl, including t-butyl, pentyl, heptyl, octyl, nonyl, decyl, undecyl, or docecyl);
where at least one of each adjacent pair of $R^7$ and $R^8$ is not H; and 2) obtaining ethylene polymer having an Mw of 100,000 g/mol or more.

Catalyst Compounds

In a preferred embodiment, this invention relates to catalyst compounds, and catalyst systems comprising such compounds, represented by the formula:

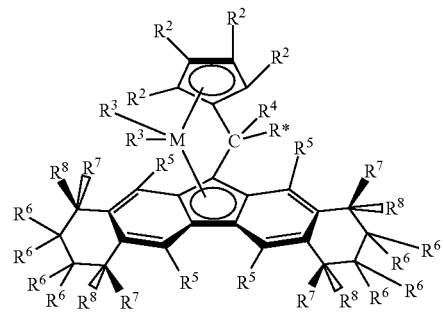

wherein M is Hf or Zr;
each $R^3$ is independently an anionic group;
each $R^2$ is independently H or a $C_1$ to $C_{20}$ hydrocarbyl or $C_1$ to $C_{20}$ substituted hydrocarbyl;
$R^4$ is H or a $C_1$ to $C_{20}$ hydrocarbyl or $C_1$ to $C_{20}$ substituted hydrocarbyl (preferably a $C_1$ to $C_{20}$ alkyl, such as butyl, t-butyl, phenyl, or substituted phenyl);
R* is phenyl or a substituted phenyl (such as an alkoxy substituted phenyl, where the alkyl of the alkoxy is a $C_1$ to $C_{20}$ alkyl);
each $R^5$ is independently H or a $C_1$ to $C_{20}$ hydrocarbyl or $C_1$ to $C_{20}$ substituted hydrocarbyl (preferably methyl, ethyl, propyl, butyl, including t-butyl, pentyl, heptyl, octyl, nonyl, decyl, undecyl, docecyl, or an isomer thereof);
each $R^6$ is independently H or a $C_1$ to $C_{20}$ hydrocarbyl or $C_1$ to $C_{20}$ substituted hydrocarbyl (preferably methyl, ethyl, propyl, butyl, including t-butyl, pentyl, heptyl, octyl, nonyl, decyl, undecyl, docecyl, or an isomer thereof);
each $R^7$ is independently H or a $C_1$ to $C_{20}$ hydrocarbyl or $C_1$ to $C_{20}$ substituted hydrocarbyl (preferably methyl, ethyl, propyl, butyl, including t-butyl, pentyl, heptyl, octyl, nonyl, decyl, undecyl, docecyl, or an isomer thereof);
each $R^8$ is independently H or a $C_1$ to $C_{20}$ hydrocarbyl or $C_1$ to $C_{20}$ substituted hydrocarbyl (preferably methyl, ethyl, propyl, butyl, including t-butyl, pentyl, heptyl, octyl, nonyl, decyl, undecyl, docecyl, or an isomer thereof); and
where at least one of each adjacent pair of $R^7$ and $R^8$ is not H.

In any embodiment of the invention, $R^2$, $R^5$, $R^6$, $R^7$ and/or $R^8$ is independently methyl, ethyl, or propyl.

In a preferred embodiment, the catalyst compound is represented by the formula:

Catalyst A

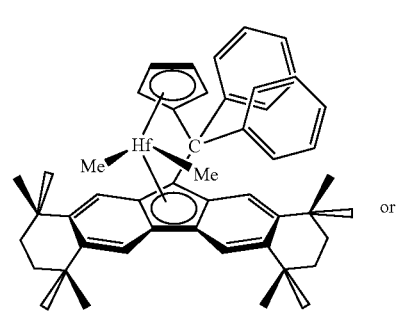

or

Catalyst B

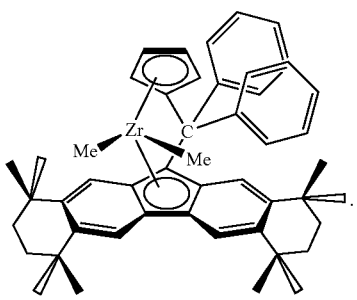

The catalyst compounds described herein may be prepared according to the general procedures described in U.S. Pat. No. 6,693,153. Synthesis of Catalysts A and B is described below in the Experimental section.

In a preferred embodiment, in any of the processes described herein one catalyst compound is used, e.g., the catalyst compounds are not different. For purposes of this invention, one catalyst compound is considered different from another if they differ by at least one atom. For example, "bisindenyl zirconium dichloride" is different from "(indenyl)(2-methylindenyl) zirconium dichloride" which is different from "(indenyl)(2-methylindenyl) hafnium dichloride."

In some embodiments, two or more different catalyst compounds are present in the catalyst system used herein. In some embodiments, two or more different catalyst compounds are present in the reaction zone where the process (es) described herein occur. When two transition metal compound based catalysts are used in one reactor as a mixed catalyst system, the two transition metal compounds are preferably chosen such that the two are compatible. A simple screening method such as by $^1$H or $^{13}$C NMR, known to those of ordinary skill in the art, can be used to determine which transition metal compounds are compatible. It is preferable to use the same activator for the transition metal compounds, however, two different activators, such as a non-coordinating anion activator and an alumoxane, can be used in combination. If one or more transition metal compounds contain an R$^4$ or R* ligand which is not a hydride, hydrocarbyl, or substituted hydrocarbyl, then the alumoxane is typically contacted with the transition metal compounds prior to addition of the non-coordinating anion activator.

The two transition metal compounds (pre-catalysts) may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percents, based upon the molecular weight of the pre-catalysts, are 10% to 99.9% A to 0.1% to 90% B, alternatively 25% to 99% A to 0.5% to 50% B, alternatively 50% to 99% A to 1% to 25% B, and alternatively 75% to 99% A to 1% to 10% B.

Activators

The terms "cocatalyst" and "activator" are used herein interchangeably and are defined to be any compound which can activate any one of the catalyst compounds described above by converting the neutral catalyst compound to a catalytically active catalyst compound cation.

After the complexes described above have been synthesized, catalyst systems may be formed by combining them with activators in any manner known from the literature including by supporting them for use in slurry or gas phase polymerization. The catalyst systems may also be added to or generated in solution polymerization or bulk polymerization (in the monomer). The catalyst system typically comprise a complex as described above and an activator such as a non-coordinating anion.

Non-limiting activators, for example, include ionizing activators, which may be neutral or ionic. Preferred activators typically include ionizing anion precursor compounds that abstract a reactive, σ-bound, metal ligand making the metal complex cationic and providing a charge-balancing noncoordinating or weakly coordinating anion.

Alumoxanes are generally oligomeric compounds containing —Al(R$^1$)—O— sub-units, where R$^1$ is an alkyl group. Examples of alumoxanes include methylalumoxane (MAO), modified methylalumoxane (MMAO), ethylalumoxane and isobutylalumoxane.

In an embodiment, little or no alumoxane is used in the polymerization processes described herein. Preferably, alumoxane is present at zero mol %, alternately the alumoxane is present at a molar ratio of aluminum to catalyst compound transition metal less than 500:1, preferably less than 300:1, preferably less than 100:1, preferably less than 1:1.

Noncoordinating Anion Activators

A noncoordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the noncoordinating anion. Suitable metals include, but are not limited to, aluminum, gold, and platinum. Suitable metalloids include, but are not limited to, boron, aluminum, phosphorus, and silicon. An activator can be either neutral or ionic. The term non-coordinating anion includes neutral activators, ionic activators, and Lewis acid activators.

"Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization.

It is within the scope of this invention to use an ionizing or stoichiometric activator, neutral or ionic, such as tri (n-butyl) ammonium tetrakis(pentafluorophenyl)borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

The catalyst systems of this invention can include at least one non-coordinating anion (NCA) activator.

In a preferred embodiment, boron containing NCA activators represented by the formula below can be used:

$$Z_d^+(A^{d-})$$

where: Z is (L-H) or a reducible Lewis acid; L is a neutral Lewis base; H is hydrogen; (L-H) is a Bronsted acid; and $A^{d-}$ is a boron containing non-coordinating anion having the charge d−; d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the transition metal catalyst precursor, resulting in a cationic transition metal species.

The activating cation $Z_d^+$ may also be a moiety such as silver, tropylium, carboniums, ferroceniums and mixtures, preferably carboniums and ferroceniums. Most preferably $Z_d^+$ is triphenyl carbonium. Preferred reducible Lewis acids can be any triaryl carbonium (where the aryl can be substituted or unsubstituted, such as those represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl), preferably the reducible Lewis acids in formula (14) above as "Z" include those represented by the formula: $(Ph_3C)$, where Ph is a substituted or unsubstituted phenyl, preferably substituted with $C_1$ to $C_{40}$ hydrocarbyls or substituted a $C_1$ to $C_{40}$ hydrocarbyls, preferably $C_1$ to $C_{20}$ alkyls or aromatics or substituted $C_1$ to $C_{20}$ alkyls or aromatics, preferably Z is a triphenylcarbonium.

When $Z_d^+$ is the activating cation $(L-H)_d^+$, it is preferably a Bronsted acid, capable of donating a proton to the transition metal catalytic precursor resulting in a transition metal cation, including ammoniums, oxoniums, phosphoniums, sylyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]^{d-}$ wherein k is 1, 2, or 3; n is 1, 2, 3, 4, 5, or 6 (preferably 1, 2, 3, or 4); n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting, examples of boron compounds which may be used as an activating cocatalyst are the compounds described as (and particularly those specifically listed as) activators in U.S. Pat. No. 8,658,556, which is incorporated by reference herein.

Most preferably, the ionic stoichiometric activator $Z_d^+ (A^{d-})$ is one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by the formula:

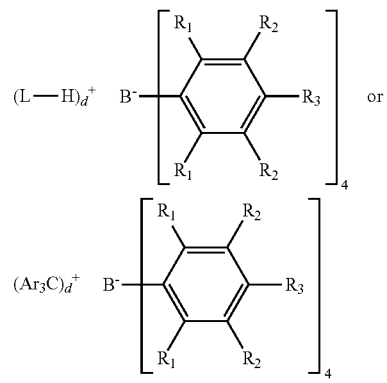

wherein:
each $R_1$ is, independently, a halide, preferably a fluoride;
Ar is substituted or unsubstituted aryl group (preferably a substituted or unsubstituted phenyl), preferably substituted with $C_1$ to $C_{40}$ hydrocarbyls, preferably $C_1$ to $C_{20}$ alkyls or aromatics;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group); each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring);
L is a neutral Lewis base; $(L-H)^+$ is a Bronsted acid; d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

Preferably $(Ar_3C)_d^+$ is $(Ph_3C)_d^+$, where Ph is a substituted or unsubstituted phenyl, preferably substituted with $C_1$ to $C_{40}$ hydrocarbyls or substituted $C_1$ to $C_{40}$ hydrocarbyls, preferably $C_1$ to $C_{20}$ alkyls or aromatics or substituted $C_1$ to $C_{20}$ alkyls or aromatics and d is 1, 2, or 3.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
| --- | --- |
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of particularly useful Bulky activators please see U.S. Pat. No. 8,658,556, which is incorporated by reference herein.

In another embodiment, one or more of the NCA activators is chosen from the activators described in U.S. Pat. No. 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Ph_3C^+][B(C_6F_5)_4^-]$, $[Me_3NH^+][B(C_6F_5)_4^-]$; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl)borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

In useful embodiments of the invention described herein, the activator is one or more of: N,N-dimethylanilinium tetrakis(pentafluorophenyl)borate, triphenylcarbenium tetrakis(pentafluorophenyl)borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium) tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyeborate, triethylsilylium tetrakis(perfluoronaphthyl)borate, benzene(diazonium) tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyeborate, triethylsilylium tetrakis(perfluorobiphenyl)borate, benzene(diazonium) tetrakis(perfluorobiphenyl)borate, $[4\text{-}t\text{-butyl-PhNMe}_2H][(C_6F_3(C_6F_5)_2)_4B]$, trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium) tetraphenylborate, tropillium tetraphenylborate, triphenylcarbenium tetraphenylborate, triphenylphosphonium tetraphenylborate, triethylsilylium tetraphenylborate, benzene(diazonium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl) ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium) tetrakis(pentafluorophenyl)borate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium) tetrakis(pentafluorophenyl)borate, trimethylammonium tetrakis-(2,3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl) ammonium tetrakis-(2,3,4,6-tetrafluoro-phenyl)borate, dimethyl(t-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium) tetrakis-(2,3,4,6-tetrafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium) tetrakis-(2,3,4,6-tetrafluorophenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri (n-butyl)ammonium tetrakis(3,5-bis(trifluoromethyl)phenyl)borate, tri(t-butyl)ammonium tetrakis(3,5-bis (trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium) tetrakis(3,5-bis (trifluoromethyl)phenyl)borate, tropillium tetrakis(3,5-bis (trifluoromethyl)phenyl)borate, triphenylcarbenium tetrakis (3,5-bis(trifluoromethyl)phenyl)borate,
triphenylphosphonium tetrakis(3,5-bis(trifluoromethyl)phenyl)borate, triethylsilylium tetrakis(3,5-bis(trifluoromethyl) phenyl)borate, benzene(diazonium) tetrakis(3,5-bis(trifluoromethyl)phenyl)borate, di-(i-propyl)ammonium tetrakis (pentafluorophenyl)borate, dicyclohexylammonium tetrakis (pentafluorophenyl)borate, tri(o-tolyl)phosphonium tetrakis (pentafluorophenyl)borate, tri(2,6-dimethylphenyl) phosphonium tetrakis(pentafluorophenyl)borate, triphenylcarbenium tetrakis(perfluorophenyl)borate, 1-(4-(tris(pentafluorophenyl)borate)-2,3,5,6-tetrafluorophenyl) pyrrolidinium, tetrakis(pentafluorophenyl)borate, 4-(tris (pentafluorophenyl)borate)-2,3,5,6-tetrafluoropyridine, triphenylcarbenium tetrakis(3,5-bis(trifluoromethyl)phenyl) borate) or a combination thereof.

The typical activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

It is also within the scope of this invention that the catalyst compounds can be combined with combinations of alumoxanes and NCA's (see for example, U.S. Pat. Nos. 5,153,157; 5,453,410; EP 0 573 120 B1; WO 94/07928; and WO 95/14044 which discuss the use of an alumoxane in combination with an ionizing activator).

Chain transfer agents may also be used in the polymerizations described herein. Useful chain transfer agents are typically alkylalumoxanes, a compound represented by the formula $AlR_3$, $ZnR_2$ (where each R is, independently, a $C_1$-$C_8$ aliphatic radical, preferably methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Optional Scavengers or Co-Activators

In addition to these activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Polymerization Processes

In embodiments herein, the invention relates to polymerization processes where monomer (such as ethylene), and optionally comonomer, are contacted with a catalyst system comprising an activator and at least one catalyst compound, as described above. The catalyst compound and activator may be combined in any order, and are combined typically prior to contacting with the monomer.

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene, norbornene, and isomers thereof. In a preferred embodiment of the invention, the monomer comprises propylene and an optional comonomers comprising one or more ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In another preferred embodiment, the monomer comprises ethylene and an optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

In a preferred embodiment, one or more dienes are present in the polymer produced herein at up to 10 wt %, preferably at 0.00001 to 1.0 wt %, preferably 0.002 to 0.5 wt %, even more preferably 0.003 to 0.2 wt %, based upon the total weight of the composition. In some embodiments, 500 ppm or less of diene is added to the polymerization, preferably 400 ppm or less, preferably or 300 ppm or less. In other embodiments, at least 50 ppm of diene is added to the polymerization, or 100 ppm or more, or 150 ppm or more.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

For purposes of this invention and the claims thereto, a solution polymerization means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, Ind. Eng. Chem. Res. 29, 2000, 4627.

For purposes of this invention and the claims thereto, a bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, preferably less than 10 wt %, preferably less than 1 wt %, preferably 0 wt %.

Polymerization processes of this invention can be carried out in any manner known in the art. Any suspension, homogeneous, bulk, or solution, polymerization process known in the art can be used. Such processes can be run in a batch, semi-batch, or continuous mode. Homogeneous polymerization processes are preferred. (Preferred homogeneous polymerization processes are those where at least 90 wt % of the product is soluble in the reaction media.) A bulk homogeneous process is particularly preferred, especially one where monomer concentration in all feeds to the reactor is 70 vol % or more. Alternately, no solvent or diluent is present or added in the reaction medium, (except for the small amounts used as the carrier for the catalyst system or other additives, or amounts typically found with the monomer; e.g., propane in propylene). In another preferred embodiment, the process is a solution process.

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

In a preferred embodiment, the feed concentration of the monomers and comonomers for the polymerization is 60 vol % solvent or less, preferably 40 vol % or less, or preferably 20 vol % or less, based on the total volume of the feedstream. Preferably the polymerization is run in a bulk process.

Preferred polymerizations can be run at any temperature and/or pressure suitable to obtain the desired ethylene polymers. Typical temperatures and/or pressures include a temperature in the range of from about 60° C. to about 200° C., preferably about 70° C. to about 200° C., preferably about 80° C. to about 175° C., preferably from about 85° C. to about 160° C.; and optionally at a pressure in the range of from about 0.35 MPa to about 10 MPa, preferably from about 0.45 MPa to about 6 MPa, or preferably from about 0.5 MPa to about 4 MPa.

In a typical polymerization, the run time of the reaction is up to 300 minutes, preferably in the range of from about 5 to 250 minutes, or preferably from about 10 to 120 minutes.

In some embodiments, hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa).

In a preferred embodiment, little or no alumoxane is used in the process to produce the polymers. Preferably, alumoxane is present at zero mol %, alternately the alumoxane is present at a molar ratio of aluminum to transition metal less than 500:1, preferably less than 300:1, preferably less than 100:1, preferably less than 1:1.

In a preferred embodiment, little or no scavenger is used in the process to produce the ethylene polymer. Preferably, scavenger (such as tri-alkyl aluminum) is present at zero mol %, alternately the scavenger is present at a molar ratio of scavenger metal to transition metal of less than 100:1, preferably less than 50:1, preferably less than 15:1, preferably less than 10:1.

In a preferred embodiment, the polymerization:
1) is conducted at temperatures of 60° C. to 300° C. (preferably 70° C. to 200° C., preferably 80° C. to 160° C.);
2) is conducted at a pressure of atmospheric pressure to 10 MPa (preferably 0.35 to 10 MPa, preferably from 0.45 to 6 MPa, preferably from 0.5 to 4 MPa);
3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are present in the solvent at less than 1 wt %, preferably less than 0.5 wt %, preferably at 0 wt % based upon the weight of the solvents);
4) wherein the catalyst system used in the polymerization comprises less than 0.5 mol %, preferably 0 mol % alumoxane, alternately the alumoxane is present at a molar ratio of aluminum to transition metal less than 500:1, preferably less than 300:1, preferably less than 100:1, preferably less than 1:1;
5) the polymerization preferably occurs in one reaction zone;
6) the productivity of the catalyst compound is at least 80,000 g/mmol/hr (preferably at least 150,000 g/mmol/hr, preferably at least 200,000 g/mmol/hr, preferably at least 250,000 g/mmol/hr, preferably at least 300,000 g/mmol/hr);
7) optionally, scavengers (such as trialkyl aluminum compounds) are absent (e.g., present at zero mol %, alternately the scavenger is present at a molar ratio of scavenger metal to transition metal of less than 100:1, preferably less than 50:1, preferably less than 15:1, preferably less than 10:1); and
8) optionally, hydrogen is present in the polymerization reactor at a partial pressure of 0.001 to 50 psig (0.007 to 345 kPa), (preferably from 0.01 to 25 psig (0.07 to 172 kPa), more preferably 0.1 to 10 psig (0.7 to 70 kPa)). In a preferred embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone.

In a preferred embodiment, the polymerization occurs in one reaction zone.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Useful chain transfer agents are typically alkylalumoxanes, a compound represented by the formula $AlR_3$, $ZnR_2$ (where each R is, independently, a $C_1$-$C_8$ aliphatic radical, preferably methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Polyolefin Products

This invention also relates to compositions of matter produced by the methods described herein.

In a preferred embodiment, the process described herein produces olefin polymers, preferably polyethylene and polypropylene homopolymers and copolymers.

In a preferred embodiment, the polymers produced herein are homopolymers of ethylene or propylene, are copolymers of ethylene preferably having from 0 to 45 mol % (alternately from 0.5 to 35 mol %, alternately from 1 to 25 mol %, preferably from 3 to 10 mol %) of one or more $C_3$ to $C_{20}$ olefin comonomer (preferably norbornene and or $C_3$ to $C_{12}$ alpha-olefin, preferably propylene, butene, hexene, octene, decene, dodecene, norbornene preferably propylene, butene, hexene, octene, norbornene), or are copolymers of propylene preferably having from 0 to 45 mol % (alternately from 0.1 to 25 mol %, alternately from 0.5 to 20 mol %, alternately from 1 to 15 mol %, alternately from 3 to 10 mol %) of one or more of $C_2$ or $C_4$ to $C_{20}$ olefin comonomer (preferably ethylene or $C_4$ to $C_{12}$ alpha-olefin, preferably ethylene, butene, hexene, octene, decene, dodecene, norbornene, preferably ethylene, butene, hexene, octene, norbornene).

In a preferred embodiment, the monomer is ethylene and the comonomer is hexene, preferably from 1 to 15 mol % hexene, alternately 1 to 10 mol %.

In a preferred embodiment, the monomer is ethylene and the comonomer is octene, preferably from 1 to 15 mol % octene, alternately 1 to 10 mol %.

In a preferred embodiment, the monomer is ethylene and the comonomer is norbornene, preferably from 1 to 40 mol % norbornene, alternately 1 to 10 mol %.

In a preferred embodiment, the polymers produced herein are copolymers of ethylene preferably having from 0 to 25 mol % (alternately from 0.5 to 20 mol %, alternately from 1 to 15 mol %, preferably from 3 to 10 mol %) of one or more $C_3$ to $C_{20}$ olefin comonomers (preferably $C_3$ to $C_{12}$ alpha-olefin, preferably propylene, butene, hexene, octene, decene, dodecene, norbornene, preferably propylene, butene, hexene, octene), and from 0.1 to 25 mol % of a diene (alternately from 0.5 to 20 mol %, alternately from 1 to 15 mol %, preferably from 3 to 10 mol %), preferably the diene comprises one or more of butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, low molecular weight polybutadienes (Mw less than 1000 g/mol) and cyclic dienes such as cyclopentadiene, vinylnorbornene, norbornadiene, ethylidene norbornene, norbornene, divinylbenzene, and dicyclopentadiene.

In a preferred embodiment, the polymers produced herein are copolymers of ethylene preferably having from 0 to 25 mol % (alternately from 0.5 to 20 mol %, alternately from 1 to 15 mol %, preferably from 3 to 10 mol %) of one or more $C_3$ to $C_{20}$ olefin comonomers (preferably $C_3$ to $C_{12}$ alpha-olefin, preferably propylene, butene, hexene, octene, decene, dodecene, norbornene, preferably propylene, butene, hexene, octene, norbornene), and from 0.1 to 25 wt % of a diene (alternately from 0.5 to 20 mol %, alternately from 1 to 15 mol %, preferably from 3 to 10 mol %), preferably vinylnorbornene, norbornadiene, ethylidene norbornene, or a mixture thereof (such as vinylnorbornene and ethylidene norbornene).

Typically, the polymers produced herein have an Mw of 100,000 to 1,000,000 g/mol (preferably 125,000 to 850,000 g/mol, preferably 150,000 to 750,000 g/mol), and/or an Mw/Mn of greater than 1 to 40 (alternately 1.2 to 20, alternately 1.3 to 10, alternately 1.4 to 5, 1.5 to 4, alternately 1.5 to 3).

In a preferred embodiment, the polymer produced herein has a unimodal or multimodal molecular weight distribution as determined by Gel Permeation Chromatography (GPC). By "unimodal" is meant that the GPC trace has two peaks or inflection points. By "multimodal" is meant that the GPC trace has at least three peaks or inflection points. An inflection point is that point where the second derivative of the curve changes in sign (e.g., from negative to positive or vice versus).

Unless otherwise indicated Mw, Mn, MWD are determined by GPC as described in US 2006/0173123, pages 24-25, paragraphs [0334] to [0341].

In a preferred embodiment, the polymer produced herein has a composition distribution breadth index (CDBI) of 50% or more, preferably 60% or more, preferably 70% or more. CDBI is a measure of the composition distribution of monomer within the polymer chains and is measured by the procedure described in PCT publication WO 93/03093, published Feb. 18, 1993, specifically columns 7 and 8 as well as in Wild et al, J. Poly. Sci., Poly. Phys. Ed., Vol. 20, p. 441 (1982) and U.S. Pat. No. 5,008,204, including that fractions having a weight average molecular weight (Mw) below 15,000 are ignored when determining CDBI.

Blends

In another embodiment, the polymer (preferably the polyethylene, polypropylene or ethylene propylene diene monomer polymer) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In a preferred embodiment, the polymer (preferably the polyethylene, polypropylene or EPDM) is present in the above blends, at from 10 to 99 wt %, based upon the weight of the polymers in the blend, preferably 20 to 95 wt %, even more preferably at least 30 to 90 wt %, even more preferably at least 40 to 90 wt %, even more preferably at least 50 to 90 wt %, even more preferably at least 60 to 90 wt %, even more preferably at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Experimental

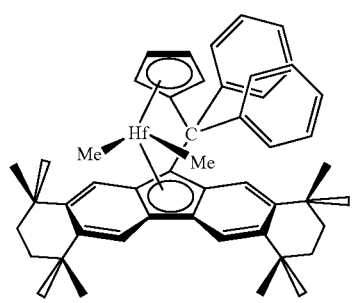

Catalyst A

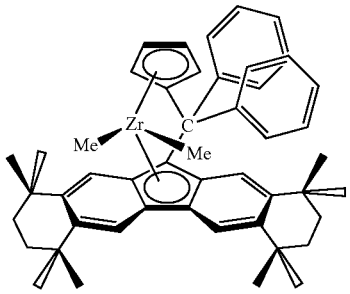

Catalyst B

Catalysts A and B were made according to the procedures described below.

Catalyst C is (o-SiEt$_3$-Ph)$_2$C(Cp)(3,7 di-t-Bu-Flu)HfMe$_2$.

Catalyst D is Ph$_2$C(Cp)(3,7 di-Ph-Flu)HfMe$_2$.

Catalyst E is Ph$_2$C(Cp)(3,7 di-t-Bu-Flu)HfMe$_2$.

Test Methods

Crystallization temperature ($T_c$) and melting temperature (or melting point, $T_m$) are measured using Differential Scanning calorimetry (DSC) on a commercially available instrument (e.g., TA Instruments 2920 DSC). Typically, 6 to 10 mg of molded polymer or plasticized polymer are sealed in an aluminum pan and loaded into the instrument at room temperature. Melting data (first heat) is acquired by heating the sample to at least 30° C. above its melting temperature, typically 220° C. for polypropylene, at a heating rate of 10° C./min. The sample is held for at least 5 minutes at this temperature to destroy its thermal history. Crystallization data are acquired by cooling the sample from the melt to at least 50° C. below the crystallization temperature, typically −50° C. for polypropylene, at a cooling rate of 20° C./min. The sample is held at this temperature for at least 5 minutes, and finally heated at 10° C./min to acquire additional melting data (second heat). The endothermic melting transition (first and second heat) and exothermic crystallization transition are analyzed according to standard procedures. The melting temperatures reported are the peak melting temperatures from the second heat unless otherwise specified.

For polymers displaying multiple peaks, the melting temperature is defined to be the peak melting temperature from the melting trace associated with the largest endothermic calorimetric response (as opposed to the peak occurring at the highest temperature). Likewise, the crystallization temperature is defined to be the peak crystallization temperature from the crystallization trace associated with the largest exothermic calorimetric response (as opposed to the peak occurring at the highest temperature).

Areas under the DSC curve are used to determine the heat of transition (heat of fusion, Hf, upon melting or heat of crystallization, H$_e$, upon crystallization), which can be used to calculate the degree of crystallinity (also called the percent crystallinity). The percent crystallinity (X %) is calculated using the formula: [area under the curve (in J/g)/H° (in J/g)] * 100, where H° is the ideal heat of fusion for a perfect crystal of the homopolymer of the major monomer component. These values for H° are to be obtained from the *Polymer Handbook, Fourth Edition*, published by John Wiley and Sons, New York, 1999, except that a value of 290 J/g is used for H° (polyethylene), a value of 140 J/g is used for H° (polybutene), and a value of 207 J/g is used for H° (polypropylene).

Catalyst Compounds
Synthesis of Catalyst B, $C_{49}H_{56}Zr$ ($C_2Me_4(CH_2)_2)_2$Fl (5.0 g, 12.9 mmol) was dissolved into $Et_2O$ (100 ml) and 10M nBuli (1.5 ml, 15 mmol) was then slowly added. The reaction was stirred overnight at room temperature. Crude $^1H$ NMR showed that the reaction was complete. After the amount of $Et_2O$ was reduced, the product (6.0 g) was isolated by filtration. The fluorenyl lithium (1.4 g, 3.0 mmol) was then slurried into toluene and reacted with diphenyl fulvene (0.69 g, 3.0 mmol) overnight. All volatiles were removed under vacuo and the crude product was reslurried in hexane. $Ph_2CCp(C_2Me_4(CH_2)_2)_2$FlLi (1.6 g, 2.6 mmol) was isolated by filtration and washed by hexane. It was then dissolved in THF (50 ml) and KH (0.4 g, 10.4 mmol) was added in one portion. The reaction was stirred at room temperature for 3 days. Crude $^1H$ NMR showed that the reaction was complete. Excess KH was removed by filtration. All volatiles were removed under vacuo. The product (1.25 g) was isolated as a dark purple solid. The solid Li/K salt (1.25 g, 1.78 mmol) was slurried in $Et_2O$ (10 ml) and toluene (20 ml) mixture and reacted with $ZrCl_4$ (0.415 g, 1.78 mmol). The reaction was stirred at room temperature for 6 hours. Crude $^1H$ NMR showed that the reaction was complete. MeMgI (1.4 ml, 3 M in Et2O) was then added and the reaction was stirred at 48° C. for 16 hours. Crude $^1H$ NMR showed that reaction is complete. The reaction was cooled to room temperature and 1, 4 dioxane (0.6 ml) was added. The mixture was stirred for 15 min and solids were removed by filtration on celite and the crude product was redissolved into pentane. Leftover solids were removed by filtration on celite. All volatiles were then removed under vacuo. Final product ($C_{49}H_{56}Zr$) was isolated as a solid (0.6 g), which was analyzed by $^1H$ NMR ($CD_2Cl_2$, 400 MHz): δ 8.17 (s, 2H), 7.94 (ddd, J=8.0, 2.0, 1.2 Hz, 2H), 7.87-7.79 (m, 2H), 7.42 (td, J=7.6, 1.7 Hz, 2H), 7.32-7.20 (m, 4H), 6.24 (t, J=2.6 Hz, 2H), 6.09 (s, 2H), 5.40 (d, J=0.7 Hz, 2H), 1.76-1.54 (m, 8H), 1.45 (s, 6H), 1.42 (s, 6H), 0.96 (s, 6H), 0.81 (s, 6H), −1.73 (s, 6H).

Synthesis of Catalyst A, $C_{49}H_{56}Hf$

The solid dilithio salt (1.0 g) was slurried in $Et_2O$ (50 ml) and reacted with $HfCl_4$ (0.4 g). The reaction was stirred at room temperature for 30 min. Crude $^1H$ NMR showed that the reaction was complete. MeMgI (1.0 g, 3 M in Et2O) was then added and the reaction was stirred at 70° C. for 1 hours. Crude $^1H$ NMR showed that reaction is complete. The reaction was cooled to room temperature and 1, 4 dioxane (2 ml) was added. The mixture was stirred for 15 min and solids were removed by filtration on celite. All volatiles were then removed under vacuo. Final product ($C_{49}H_{56}Hf$) was isolated as a solid (0.5 g), which was analyzed by $^1H$ NMR ($CD_2Cl_2$, 400 MHz): δ 8.16 (s, 2H), 7.99-7.90 (m, 2H), 7.86-7.79 (m, 2H), 7.46-7.38 (m, 2H), 7.35-7.09 (m, 4H), 6.16 (t, J=2.7 Hz, 2H), 6.14 (s, 2H), 5.37 (t, J=2.6 Hz, 2H), 1.78-1.53 (m, 8H), 1.44 (s, 6H), 1.43 (s, 6H), 0.96 (s, 6H), 0.82 (s, 6H), −1.93 (s, 6H).

High Throughput Experimentation (HTE) General Description

Typical solution polymerizations were carried out in using high throughput robotic system manufactured by Symyx Technologies (Santa Clara, Calif.). The experimental details were developed using Library Studio version 7.1.9. The reactions were carried out in parallel with robotic control and typically take less than 2 hrs for completion. Individual reaction wells were lined with disposable glass inserts and were equipped with Teflon stirring paddles. Stock solutions of metallocene and activator in toluene were added separately to an isohexane reaction solvent containing a specific amount of scavenger, $Al(C_8H_{17})_3$. Monomers were then added and the reactions controlled either by time or in some cases by a pre-specified pressure drop. The total volume of monomers, solvent, metallocene, activator and scavenger was maintained at 5.4 ml. The reactions were quenched with $CO_2$ addition and the volatiles were removed under reduced pressure.

Ethylene-Octene Copolymerizations

The ethylene pressure was maintained at 125 psi and 50 microliters of octene was used per run. The reaction temperature was 110° C. The amount of activator (N,N-dimethylanilinium tetrakis(pentafluorophenyl)borate) was 0.022 micromol and that of the catalyst compound (A, C, D, or E) was 0.020 micromol per experiment. The scavenger used was tri-n-octylaluminum in the amount of 0.45 micromol per experiment. The reaction was quenched after 20 psi ethylene was consumed. Relative activities are reported in FIG. 1.

Figure 2:
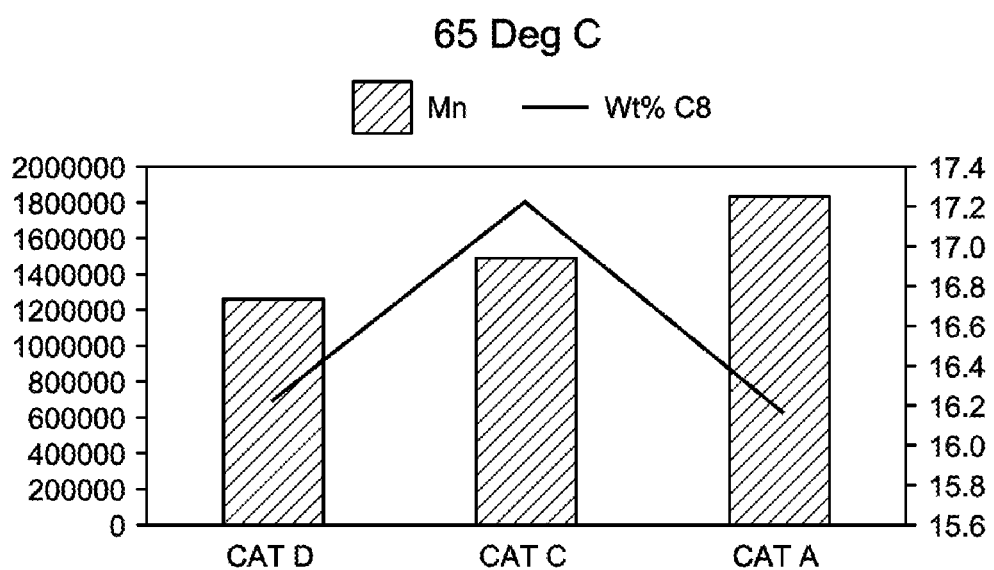
FIG. 2 is a graph showing a comparison of Mn (g/mol) to comonomer content (wt %) at 65° C.
Figure 3:
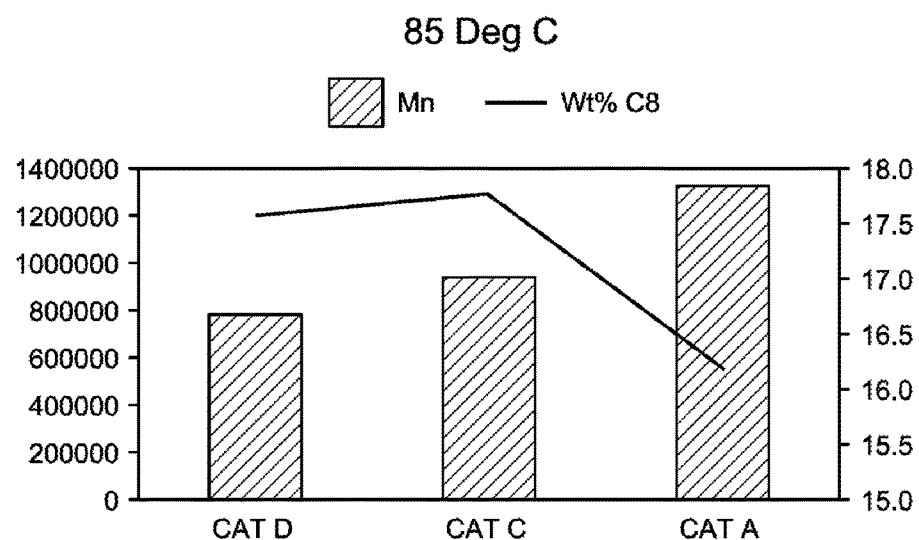
FIG. 3 is a graph showing a comparison of Mn (g/mol) to comonomer content (wt %) at 85° C.
Figure 4:
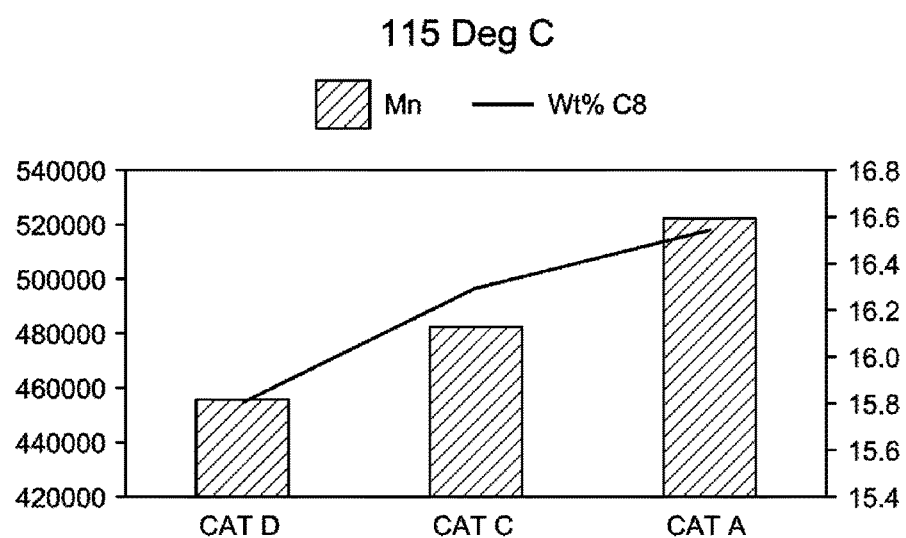
FIG. 4 is a graph showing a comparison of Mn (g/mol) to comonomer content (wt %) at 115° C.
Figure 5:
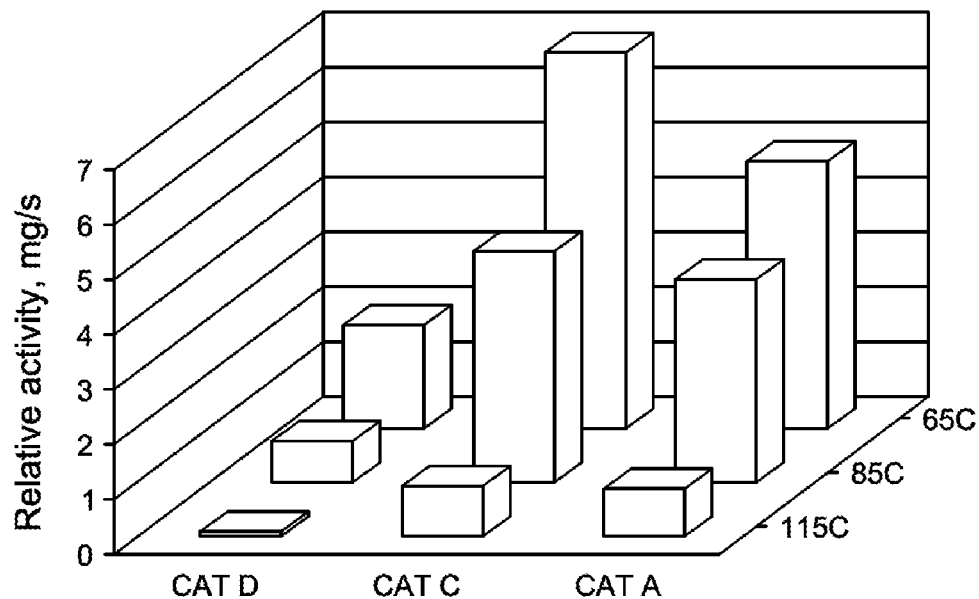
FIG. 5 is graph showing relative activities from ethylene octene copolymers at 65° C., 85° C., and 115° C.

The procedure above was followed for additional ethylene-octene copolymerizations. Catalyst compounds A, C and D were run at 3 different temperatures (65° C., 85° C., and 115° C.) using 60 microliters of octene. All other variables were the same as above. FIGS. 2, 3, and 4 show comparisons of molecular weight and octene comonomer content. FIG. 5 shows the relative activities of Catalyst compounds A, C, and D at 65° C., 85° C., and 115° C. The data in the figures are the average of 4 runs each and show that catalyst compound A produces the highest Mn at any temperature but is superior at 115° C.

Ethylene-Propylene Copolymerizations

Catalyst compounds A, C, D, and E were run according to the procedure above with ethylene and propylene at 110° C. Ethylene pressure was 125 psi. Propylene was present at 75, 150, or 250 microliters. Propylene comonomer wt % incorporation Mw and Mn are listed in the table below. Note that Mw's are higher for inventive Catalyst A at same level of propylene incorporation as compared with benchmark Catalyst C.

Ethylene-Propylene Copolymerization

| Propylene content (microliters) | Catalyst Compound | Propylene (wt %) | Mw (g/mol) |
|---|---|---|---|
| 250 | C | 59.9 | 256,469 |
| 250 | E | 63.4 | 287,946 |
| 250 | D | 60.1 | 450,301 |
| 250 | C | 63.3 | 336,230 |
| 250 | E | 63.4 | 503,721 |
| 250 | D | 59.8 | 544,068 |
| 250 | A | 63.4 | 466,066 |
| 150 | C | 60.8 | 447,032 |
| 150 | E | 62.2 | 414,001 |
| 150 | D | 59.6 | 460,815 |
| 150 | A | 52.6 | 479,615 |
| 150 | C | 50.9 | 525,934 |
| 150 | E | 50 | 559,513 |
| 150 | D | 59.7 | 538,707 |
| 150 | A | 59.5 | 584,861 |
| 75 | C | 45.9 | 792,129 |
| 75 | E | 63.4 | 535,799 |
| 75 | D | 57 | 685,823 |
| 75 | A | 62.3 | 700,078 |
| 75 | C | 42.7 | 717,907 |
| 75 | E | 59.7 | 619,737 |
| 75 | A | 59.2 | 752,474 |

Ethylene-Norbornene Copolymerizations

Figure 6:
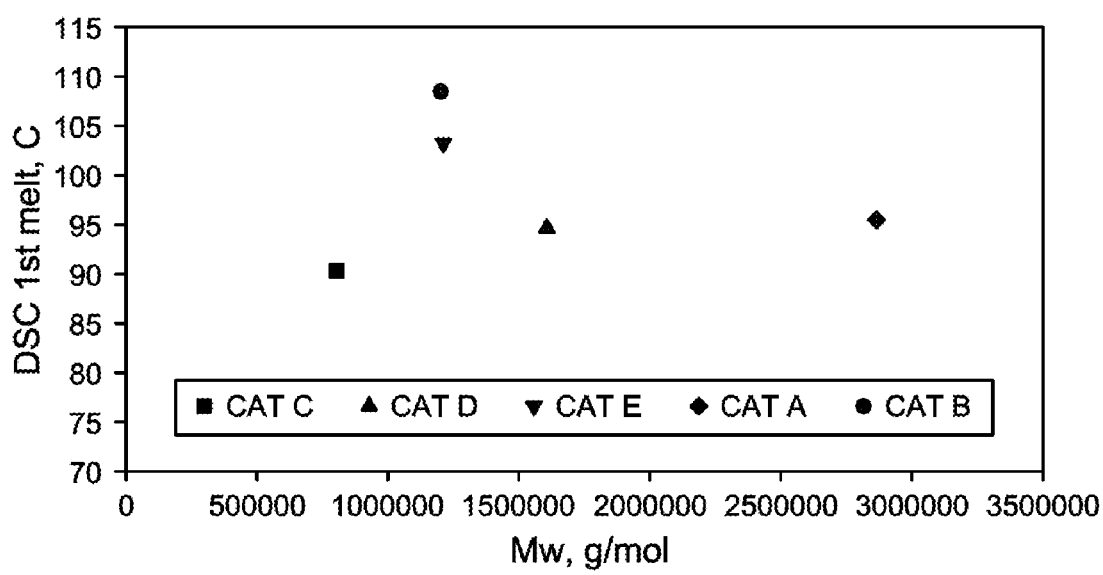
FIG. 6 is a graph showing melting point of ethylene norbornene copolymers.
Figure 7:
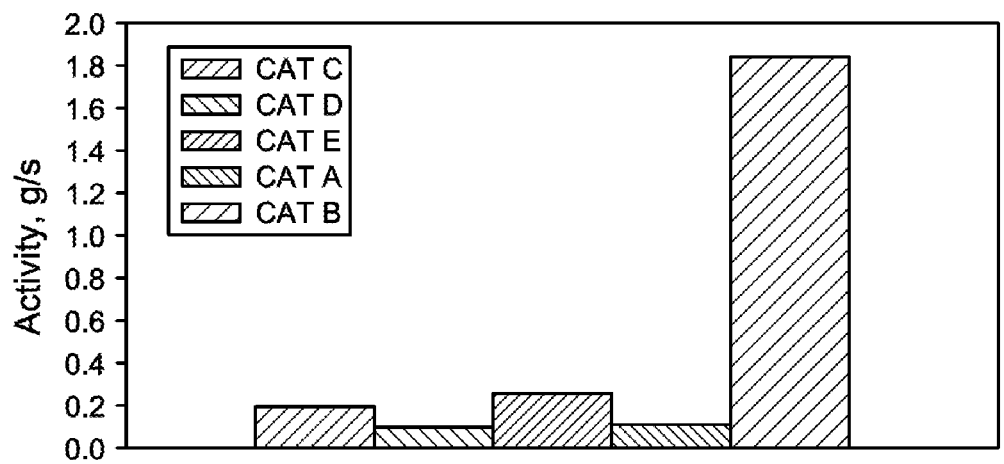
FIG. 7 is a graph showing activities of ethylene norbornene copolymerizations.

The procedure above was followed for ethylene-norbornene copolymerizations using activator N,N-dimethylanilinium tetrakis(pentafluorophenyl)borate. Norbornene was added to the reactor as a solution of 85 wt % norbornene (NB) in toluene. To each cell, 42 microliters of the NB solution was added. The ethylene pressure was maintained at 125 psi throughout the reaction. The reaction temperature was 110° C. The catalyst compound amount for each cell was 0.02 micromol and the amount of activator (N,N-dimethylanilinium tetrakis(pentafluorophenyl)borate) was 0.022 micromol. Tri-n-octylaluminum was used as a scavenger in the amount of 0.450 micromol. The reaction was quenched when 40 psi of ethylene was consumed. The data are reported in FIGS. 6 and 7 (data points in FIG. 6 are average of at least 5 replicates and at least 6 replicates in FIG. 7).

Figure 8:
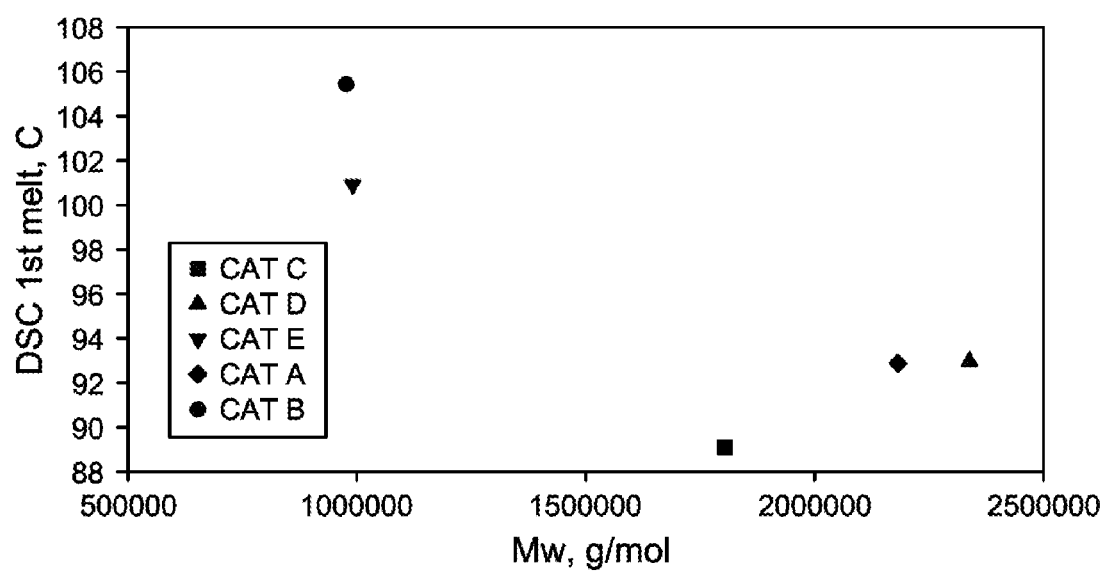
FIG. 8 is a graph showing melting point of ethylene norbornene copolymers.
Figure 9:
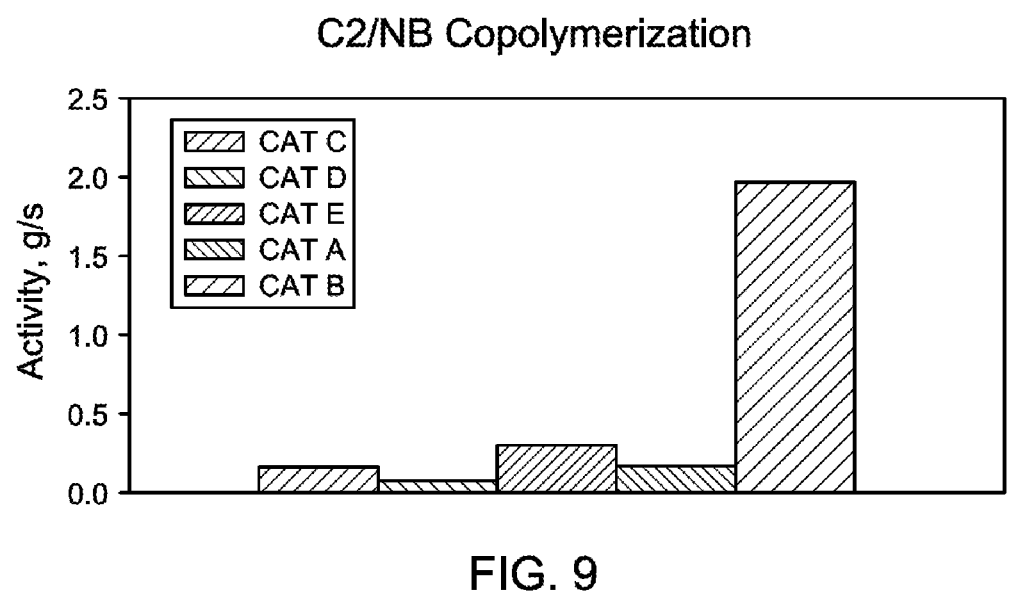
FIG. 9 is a graph showing activities of ethylene norbornene copolymerizations.

The procedure above was followed for additional ethylene-norbornene copolymerizations using activator N,N-dimethylanilinium tetrakis(pentafluoronaphthnyl)borate. Norbornene was added as a solution of 85 wt % norbornene in toluene. To each cell, 42 microliters of the NB solution was added. The ethylene pressure was maintained at 125 psi throughout the reaction. The reaction temperature was 110° C. The catalyst compound amount for each cell was 0.02 micromol and the amount of activator was 0.022 micromol. Tri-n-octylaluminum was used as a scavenger in the amount of 0.450 micromol. The reaction was quenched when 40 psi of ethylene was consumed. The data are reported in FIGS. 8 and 9 (data points in FIG. 8 are average of at least 4 replicates and at least 6 replicates in FIG. 9).

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," or "selected from the group of consisting of," preceding the recitation of the composition, element, or elements and vice versa.

The invention claimed is:

1. A process to polymerize olefins comprising contacting, in solution phase at a temperature of 85° C. to 200° C., ethylene, at least one olefin comonomer, and optional diene, with a catalyst system comprising a non-coordinating anion activator and a metallocene catalyst compound represented by the formula:

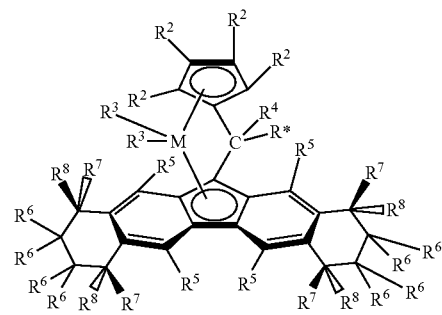

wherein:

M is Hf;

each $R^3$ is independently an anionic group;

each $R^2$ is independently H or a $C_1$ to $C_{20}$ hydrocarbyl or $C_1$ to $C_{20}$ substituted hydrocarbyl;

$R^4$ is a hydrocarbyl radical having from 1 to 20 carbon atoms, hydrides, amides, alkoxides, sulfides, phosphides, halides, dienes, amines, phosphines, ethers, and a combination thereof;

R* is phenyl or a substituted phenyl;

each $R^5$ is independently H or a $C_1$ to $C_{20}$ hydrocarbyl or $C_1$ to $C_{20}$ substituted hydrocarbyl;

each $R^6$ is independently H or a $C_1$ to $C_{20}$ hydrocarbyl or $C_1$ to $C_{20}$ substituted hydrocarbyl;

each $R^7$ is independently H or a $C_1$ to $C_{20}$ hydrocarbyl or $C_1$ to $C_{20}$ substituted hydrocarbyl;

each $R^8$ is independently H or a $C_1$ to $C_{20}$ hydrocarbyl or $C_1$ to $C_{20}$ substituted hydrocarbyl;

where at least one of each adjacent pair of $R^7$ and $R^8$ is not H; and 2) obtaining ethylene copolymer comprising ethylene, from 0.5 to 25 mol % $C_3$ to $C_{20}$ olefin comonomer, and optionally from 0.5 to 20 mol % diene, said ethylene copolymer having a Mw greater than 100,000 g/mol where the % olefin comonomer incorporated is X % or more, where X=(Z−858,441)/(−26,760), where Z is the Mn in g/mol of the ethylene copolymer.

2. The process of claim 1, wherein $R^4$ is a $C_1$ to $C_{20}$ hydrocarbyl or $C_1$ to $C_{20}$ substituted hydrocarbyl.

3. The process of claim 1, wherein $R^4$ is a $C_1$ to $C_{20}$ alkyl.

4. The process of claim 1, wherein $R^4$ and R* are independently a phenyl or a substituted phenyl.

5. The process of claim 1, wherein R* is alkoxy substituted phenyl, where an alkyl in the alkoxy is a $C_1$ to $C_{20}$ alkyl.

6. The process of claim 1, wherein each $R^6$ $R^7$ and $R^8$ is independently H or a $C_1$ to $C_{20}$ hydrocarbyl.

7. The process of claim 1, wherein each $R^5$, $R^6$, $R^7$ and $R^8$ is independently hydrogen, methyl, ethyl, propyl, butyl, pentyl, heptyl, octyl, nonyl, decyl, undecyl, docecyl, or an isomer thereof.

8. The process of claim 1 claim 1, wherein the catalyst compound comprises:

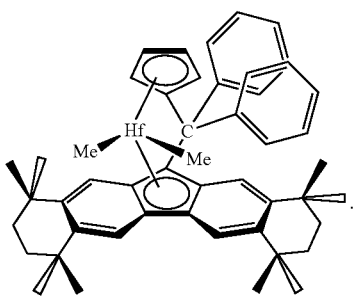

9. The process of claim 1, wherein the activator comprises 0 mol % alumoxane.

10. The process of claim 1, wherein the activator is represented by the formula:

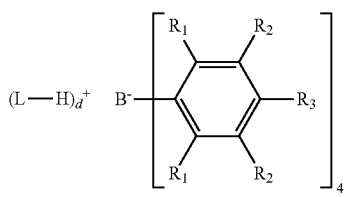

where:
- each $R_1$ is, independently, a halide;
- each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group;
- each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group;
- L is an neutral Lewis base; (L-H)$^+$ is a Bronsted acid; d is 1, 2, or 3, or (L-H)$^{30}$ d is $(Ar_3C)^{30}{}_d$ where Ar is substituted or unsubstituted aryl group;
- wherein the anion has a molecular weight of greater than 1020 g/mol; and
- wherein at least three of the substituents on the B atom each have a molecular volume of greater than 250 cubic Å.

11. The process of claim 10, wherein $(L-H)_d{}^{30}$ is $(Ar_3 C)_d{}^{30}$, where Ar is substituted or unsubstituted aryl group.

12. The process of claim 1, wherein the activator is one or more of:
N,N-dimethylanilinium tetrakis(pentafluorophenyl)borate, triphenylcarbenium tetrakis(pentafluorophenyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium) tetrakis (perfluoronaphthyl)borate, tropillium tetrakis (perfluoronaphthyl)borate, triphenylcarbenium tetrakis (perfluoronaphthyl)borate, triphenylphosphonium tetrakis (perfluoronaphthyl)borate, triethylsilylium tetrakis(perfluoronaphthyl)borate, N,N-dimethylanilinium tetrakis(perfluorobiphenyl)borate, N,N-diethylanilinium tetrakis (perfluorobiphenyl)borate, N,N-dimethyl-(2,4,6-trimethylanilinium) tetrakis (perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, [4-t-butyl-PhNMe$_2$H][($C_6F_3(C_6F_5)_2)_4$B], triphenylcarbenium tetrakis-(2,3,4,6-tetrafluorophenyl)borate, N,N-dimethylanilinium tetrakis(3,5-bis(trifluoromethyl)phenyl)borate, N,N-diethylanilinium tetrakis(3,5-bis (trifluoromethyl)phenyl)borate, N,N-dimethyl-(2,4,6-trimethylanilinium) tetrakis(3,5-bis (trifluoromethyl)phenyl)borate, tropillium tetrakis(3,5-bis (trifluoromethyl)phenyl)borate, and triphenylcarbenium tetrakis(3,5-bis(trifluoromethyl)phenyl)borate.

13. The process of claim 1, wherein the process occurs at a temperature of from about 60° C. to about 160° C., at a pressure in the range of from about 0.35 MPa to about 10 MPa, and at a time up to 300 minutes.

14. The process of claim 1, wherein the comonomer comprises one or more of propylene, butene, pentene, hexene, heptene, octene, nonene, decene, undecene, dodecene, norbornene and isomers thereof.

15. The process of claim 1, wherein the comonomer comprises propylene.

16. The process of claim 1, wherein the comonomer comprises propylene and norbornene.

17. The process of claim 1, wherein the comonomer comprises octene.

18. The process of claim 1, wherein the comonomer comprises propylene and diene.

19. The process of claim 18, where the diene is ethylidene norbornene and/or vinyl norbornene.

20. A process to polymerize olefins comprising contacting, in solution phase at a temperature of 85° C. to 200° C., ethylene, diene, and optionally a $C_3$ to $C_{20}$ olefin comonomer, with a catalyst system comprising a non-coordinating anion activator and a metallocene catalyst compound represented by the formula:

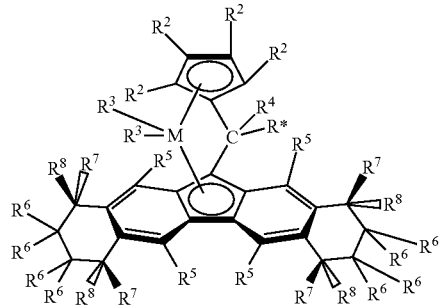

wherein
- M is Hf or Zr;
- each $R^3$ is independently an anionic group;
- each $R^2$ is independently H or a $C_1$ to $C_{20}$ hydrocarbyl or $C_1$ to $C_{20}$ substituted hydrocarbyl;
- $R^4$ is a hydrocarbyl radical having from 1 to 20 carbon atoms, hydrides, amides, alkoxides, sulfides, phosphides, halides, dienes, amines, phosphines, ethers, and a combination thereof;
- $R^*$ is phenyl or a substituted phenyl;
- each $R^5$ is independently H or a $C_1$ to $C_{20}$ hydrocarbyl or $C_1$ to $C_{20}$ substituted hydrocarbyl;
- each $R^6$ is independently H or a $C_1$ to $C_{20}$ hydrocarbyl or $C_1$ to $C_{20}$ substituted hydrocarbyl;
- each $R^7$ is independently H or a $C_1$ to $C_{20}$ hydrocarbyl or $C_1$ to $C_{20}$ substituted hydrocarbyl;
- each $R^8$ is independently H or a $C_1$ to $C_{20}$ hydrocarbyl or $C_1$ to $C_{20}$ substituted hydrocarbyl;
- where at least one of each adjacent pair of $R^7$ and $R^8$ is not H; and 2) obtaining an ethylene copolymer comprising from 0.5 to 20 mol % diene, optionally from 0.5 to 25 mol % $C_3$ to $C_{20}$ olefin comonomer, and said ethylene copolymer having a Mw greater than 400,000 g/mol, where a % olefin comonomer incorporated is X % or more, where X=(Z−858,441)/(−26,760), where Z is Mn in g/mol of the ethylene copolymer.

* * * * *